(12) United States Patent
Ward et al.

(10) Patent No.: US 9,504,969 B2
(45) Date of Patent: Nov. 29, 2016

(54) SHEARING FIBROUS BIO-SLUDGE

(75) Inventors: Owen Patrick Ward, Waterloo (CA); Ajay Singh, Milton (CA)

(73) Assignee: LYSTEK INTERNATIONAL, INC., Cambridge, Ontario (CA)

( * ) Notice: Subject to any disclaimer, the term of this patent is extended or adjusted under 35 U.S.C. 154(b) by 166 days.

(21) Appl. No.: 13/166,060

(22) Filed: Jun. 22, 2011

(65) Prior Publication Data
US 2013/0067973 A1    Mar. 21, 2013

(30) Foreign Application Priority Data

Jun. 23, 2010    (GB) .................... 1010562.5

(51) Int. Cl.
| | | |
|---|---|---|
| *B01F 3/12* | (2006.01) | |
| *C05F 3/00* | (2006.01) | |
| *C05F 1/00* | (2006.01) | |

(52) U.S. Cl.
CPC ............. *B01F 3/1214* (2013.01); *C05F 1/005* (2013.01); *C05F 3/00* (2013.01); *Y02P 20/145* (2015.11)

(58) Field of Classification Search
CPC .... B01F 3/1214; C02F 11/004; C02F 11/12; C02F 11/14; C02F 11/18; C05F 1/005
USPC ...... 71/11, 12, 13, 15, 16, 22; 210/710, 605, 210/609, 723–725; 588/252, 253; 366/241–244, 379
See application file for complete search history.

(56) References Cited

U.S. PATENT DOCUMENTS

| | | | |
|---|---|---|---|
| 3,767,416 | A | 10/1973 | Lee |
| 4,057,392 | A * | 11/1977 | O'Donnell .................... 422/271 |
| 6,808,636 | B2 * | 10/2004 | Ward et al. .................... 210/710 |
| 7,736,511 | B2 | 6/2010 | Lugowski et al. |
| 2008/0302889 | A1 * | 12/2008 | Ward et al. ........................ 241/2 |
| 2009/0107920 | A1 | 4/2009 | Ward et al. |
| 2010/0223969 | A1 | 9/2010 | Ward et al. |

OTHER PUBLICATIONS

Waste Minimisation and Management, by David MacFarlane, published by Meat Research Laboratory, Australia, in 1995.

* cited by examiner

*Primary Examiner* — Wayne Langel
(74) *Attorney, Agent, or Firm* — Anthony Asquith Corp.

(57) ABSTRACT

Paunch-sludge from an abattoir is mixed with the fatty DAF-float from an abattoir, and placed in a shearing vessel. The mixture of the two material thickens the medium in which the matted strands are contained, enabling shearing to be more effective; so much so that paunch-sludge can now be sheared to a homogeneous liquid. The technique can be used with other sludges and other fatty waste materials.

23 Claims, 1 Drawing Sheet

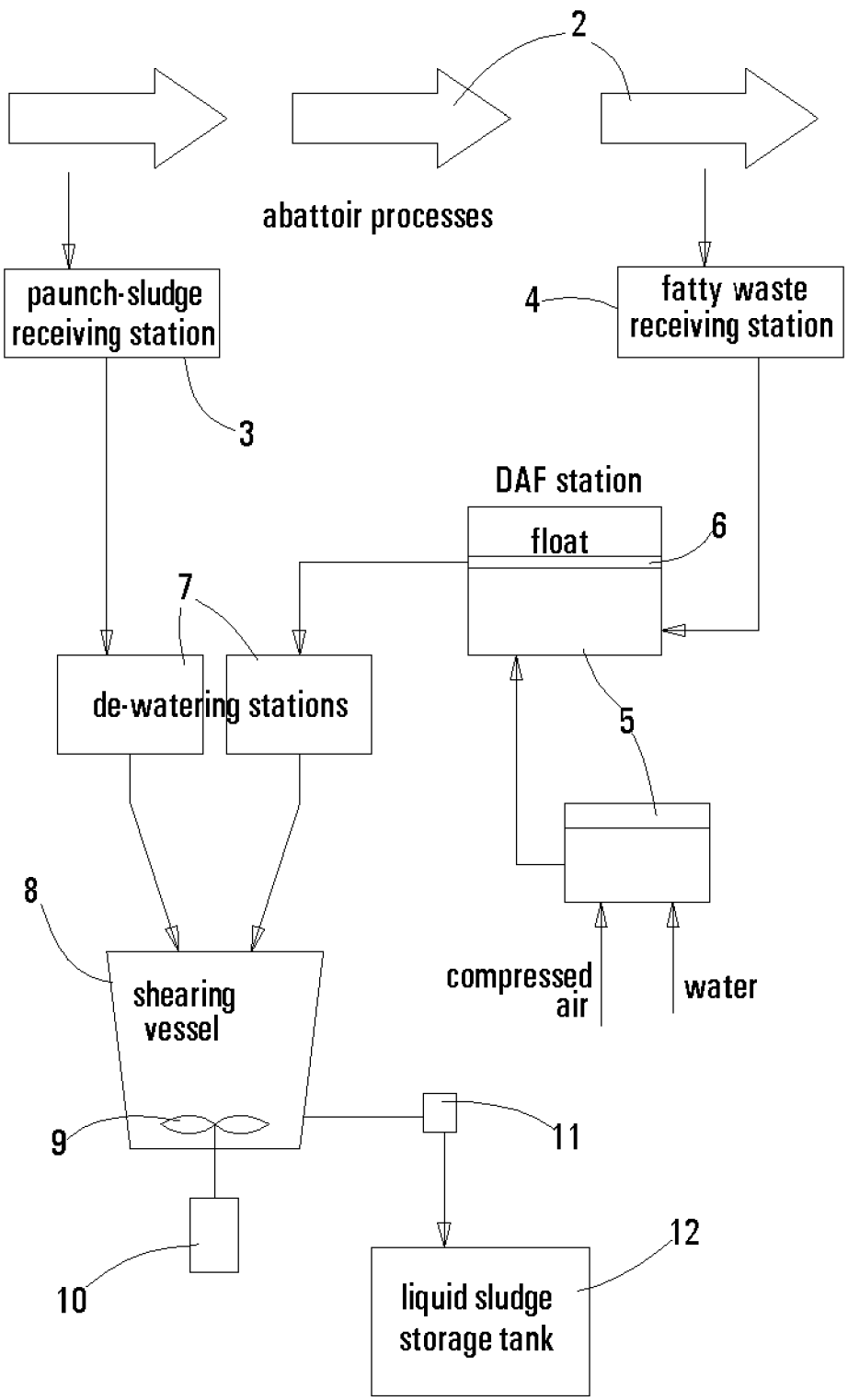

SHEARING FIBROUS BIO-SLUDGE

This technology relates to treating sludge by shearing, a procedure that is aimed at liquefying and homogenizing the sludge.

The technology disclosed herein is a development of that disclosed in patent publications U.S. Pat. No. 6,808,636; U.S. Pat. No. 7,736,511; US-2009/107,920; and US-2010/223,969.

Paunch-sludge, or paunch-manure, is an element of the technology. U.S. Pat. No. 3,767,416 mentions paunch-manure. An article *Waste Minimisation and Management in Abattoir Waste-water & Odour Management* published by Meat Research Laboratory, Australia, in 1995, mentions paunch manure, and also mentions Dissolved Air Flotation, which is another element of the technology.

The contents of these publications are incorporated by reference.

BACKGROUND

For the purposes of the present specification, the following definitions and other points should be noted.

Sludge is a mixture of water and solid materials. Depending on its water content, sludge may be characterized (when the solids content is e.g 3% or less) as "solids swimming in water", or (when the solids content is e.g 17% or more) as "stiff cake".

A tonne of raw 5%-solids sludge contains 50 kg of solids and 950 kg of water. Handling/transporting/treating such sludge in its raw, watery, state is wastefully expensive, and desirably the sludge is de-watered prior to processing. Sludge is routinely de-watered by mechanically squeezing, centrifuging, etc, to reduce its water content.

The amount of water that can be removed by routine de-watering depends on the equipment available and other factors; in the case of paunch-manure, or paunch-sludge, it is routinely economical to de-water paunch-sludge to 17% solids. At that, a tonne of raw 5%-solids paunch-sludge, which contains 950 kg of water, after de-watering to 17%-solids, contains only 244 kg of water: the other 706 kg of water has been squeezed out.

Organic sludge is a mixture of water and organic substances. The term "water", as used herein, should be understood to include solutions, including saturated solutions, of whatever soluble materials might be present. In the sludges with which the present technology is concerned, the organic substances present in the sludge include a substantial proportion of intact biological cells.

Intact biological cells contain a good deal of water. When sludge that contains cells is sheared, the intact biological cells are torn apart and ripped open. When this happens, at least some of the water inside the cell is released.

The distinction is made between free water and captive water, in the sludge. To illustrate this, the example of a blade of grass will be described. The term "solid", as used herein, means solid in the sense that a blade of grass is a solid article. However, a solid blade of grass contains a good deal of captive-water, and the term "dry-solid" content of the blade of grass is used to indicate the portion of the blade of grass that remains when the grass has been dried, and all the captive-water has been driven off. The mass of a typical biological cell consists of 30% dry-mass bio-solids and 70% captive-water mass.

The sheared bio-solid material can be dried, e.g by prolonged heating, whereby the captive-water is driven off. The dry solid residue that then remains is the so-called dry-mass of that blade of grass.

Thus, in a typical batch of biological sludge, e.g a batch of paunch-manure from an abattoir, the dry-mass of the bio-solids might be e.g five percent of the overall mass of the sludge. The remaining 95% of the overall sludge is water (including both free-water and captive-water).

Thus, a tonne of untreated 5% paunch-manure comprises 50 kg dry-mass of bio-solids, in which is locked 117 kg of captive-water. The 167 kg of grass (comprising 50 kg of dry bio-solids and 117 kg of captive-water) is present in the tonne of 5% paunch-manure sludge, along with 833 kg of free-water.

Some of the free-water (but (almost) none of the captive-water) can be extracted from the paunch by filtering, mechanical squeezing, centrifuging, or a combination thereof. Typically, the paunch-sludge, after the removal of free-water by centrifuging, will be de-watered to e.g 17% solids; or, in other words, the free-water component has been reduced, in the now de-watered paunch-sludge, from 883 kg to 294 kg. Thus, de-watering transforms the one tonne (1000 kg) of 5%-dry-mass paunch-sludge into 411 kg of 17%-dry-mass paunch-sludge—comprising the 50 kg dry-mass of bio-solids with its 117 kg of captive-water, now mixed with only 294 kg of free-water. The other 589 kg of free-water that was present in the tonne of 5%-paunch-sludge has been squeezed out in order to create the 17%-paunch-sludge.

The paunch-sludge, now de-watered to 17%-solids, is ready to be subjected to violent shearing. As a result of shearing, some of the captive-water locked up in the grass cells is released, as the biological cells are torn open. Typically, shearing paunch-sludge can be effective to free up (i.e to release) e.g 40% of the captive-water held in the grass cells. Thus, after shearing, 60% of the captive-water is still retained within the remaining bio-solid material of the grass, even though that material is no longer in the form of intact bio-cells. (That remaining water can be driven off by heating/drying.)

One of the desired results of violent shearing of sludge is to turn the sludge into a homogeneous liquid. As such, the liquefied paunch-sludge is easy to handle and to transport. Liquefied paunch-sludge would be easy to dispose of, e.g by being pumped (injected, sprayed) onto an agricultural field.

As a result of shearing, the bio-solid (solid organic) material of the cell (with its captive-water content) is torn into small fragments. Typically, after violent energetic shearing, these fragments are small enough, and so well-dispersed in the free-water, that the sheared sludge assumes the characteristics of a thick liquid emulsion, like e.g paint.

Thus, sheared sludge can be regarded as a homogeneous liquid. When a viscosity test is performed on unsheared wet sludge, often the viscosity reading is a measurement only of the viscosity of the free-water content of the sludge, rather than of the sludge as a whole substance, and thus the viscosity varies when samples are taken form different locations in the sludge. With violently sheared sludge, on the other hand, the sludge is so homogeneous that viscosity measurements of small samples of the liquid sludge are all consistent with each other—as they are with an actual liquid.

Paunch-sludge, as a substance, is generally regarded as being of negative value; that is to say, disposing of paunch-sludge carries a cost. Liquefying the paunch-sludge offers the possibility that the sheared material can now have value, e.g as a fertilizer, or at least, shearing the material can reduce the net cost of disposal. However, paunch-sludge is very difficult to liquefy, for the reasons discussed below.

Another material that is produced in abattoirs is the material known as DAF float.

In abattoirs and in meat handling and packing plants generally, a good proportion of the waste that has to be dealt with arises from fatty tissue. Most of the fatty material is present as small lumps or pieces of solid material dispersed in water. Meat plants use a good deal of water, e.g for cleaning, and the small lumps (including very small lumps) of fatty material are borne away in the wash-down water.

The fatty material has to be taken out of the water for disposal purposes. One technique is called Dissolved Air Flotation (DAF). Here, water is mixed with compressed air, which dissolves under pressure. When the air-laden water is released into the waste-water, the dissolved air bubbles out of solution, and a myriad of tiny bubbles rises through the waste-water.

The bubbles attract and pick up the lumps of fatty material dispersed through the wastewater, and carry them to the surface. A scum or froth forms at the surface, in which the pieces and lumps of fatty tissue are contained. This scum or froth is termed DAF-float.

If anything, DAF-float has even less commercial value than paunch-sludge. To minimize disposal costs, it is usual to de-water the DAF-float. In a treatment station that de-waters paunch-sludge to 17%-solids, the DAF-float would typically be de-watered to e.g 35%-solids.

35%-DAF-float has the consistency of cold butter. It is handled and transported as a greasy solid. Generally, it is disposed of in a landfill.

Returning now to paunch-sludge, although it is desirable that 17%-paunch-sludge be sheared, and thereby made homogeneous, and of the consistency of paint, shearing the 17%-paunch is not in fact effective to achieve that degree of liquefaction, or at least not in a commercially-economical short period of time.

When de-watered paunch-sludge is placed in a shearing vessel, what happens is that the shearing blades cut a cavity in the solid material, but the rest of the material in the vessel is not drawn into the blades.

Generally, when shearing sludges, the shearing action can be expected to mix the sludge very thoroughly, and lead to such a degree of homogeneousness that it is impossible to detect differences (i.e any differences, including viscosity differences) between samples, no matter where the samples are taken from over the whole body of sheared sludge. However, that does not happen when the sludge being sheared is 17%-paunch-sludge. The sludge simply resides, in the vessel, where it was deposited, and is not mixed and stirred, or even moved, by the shearing blades.

Another problem when shearing paunch-sludge is that the solids in the sludge create a high resistance force on the blades. The resistance force is proportional to blade speed, and so the blades tend to slow down, which is bad for efficiency, and is likely to shorten the life of the drive components, and especially of the shearing blades.

The reasons for these difficulties with 17%-paunch-sludge may be speculated as follows.

The reason may be connected with the shapes and sizes of the pieces of solid material, in relation to the viscosity of the water in which the pieces are dispersed. The liquid itself, being water, is of very low viscosity. On the other hand, the matted strands of partly-digested grass (which are the major component of paunch-sludge) are held together quite tightly. Thus, as the liquid water is swirled about by the blades, the matted strands of biological material remain held together, the force of the moving water being too weak to detach the individual strands from the matted mass of strands.

The strand of straw or grass, even having been bitten off, and having been partly digested, is quite long, being 25 mm long or more. Primarily for that reason, it can take a good deal of force to detach one strand from the matted mass. The forces arising due to swirling of a very low viscosity liquid like water are barely enough to detach the individual strand.

The fact that the strands have the characteristic shape of being long and thin also adds to the force needed to detach the individual strand from the matted mass. A strand that is 25 mm long would be characterized as "long and thin" if its cross-sectional area is less than 5 sq·mm over more than 70% of its length.

If the strands were shorter, or rounder, they would not be, or might not be, snagged so tightly in the matted mass of strands.

When at least 50% of the solid material of the sludge is in the form of strands that are long and thin—for example, are more than 25 mm long and less than 5 sq·mm in area—the problem is likely to arise that the matted strands are so highly resistant to being drawn out of the mat that shearing is not effective to draw them out. In sludge with strands like that, only a small degree of matting can be enough to resist the pull of the swirling water. The strands are held in the mat more forcefully than can be overcome by the viscosity of the water.

SOME FEATURES OF THE INVENTION

It is recognized, as a feature of the technology, that mixing the de-watered 17%-paunch-sludge, in the shearing-vessel, with the de-watered 35%-DAF-float, is effective to enable the paunch-sludge to be sheared, and to be thereby transformed into a homogeneous liquid having the consistency e.g of paint.

The reasons why this mixture can now very readily be liquefied, in the shearing vessel, may be speculated as follows.

When shearing first commences, the liquid water passing through the shearing blades is vigorously stirred by the blades. The DAF-float, as it also passes through the blades, despite being quite hard and solid, is quickly broken up, and becomes finely dispersed in the water.

Consequently, the free-water component of the paunch-sludge, upon being vigorously stirred and mixed together with the DAF-float, is quickly transformed into a thick viscous liquid. Thus, very soon after shearing starts, the long thin strands of solid material are caught up—not now in (low-viscosity) water, but—in a thick viscous liquid. As a result, the forces acting on the long thin strands now are indeed large enough to draw the strands into the shearing blades.

Once this starts to happens, now the shearing is effective to break up the mat of strands, and to tear the solid material of the strands, and to tear open the biological cells, and to release (some of) the water held captive therein. That is to say, once the viscosity of the liquid medium in which strands are contained increases beyond a threshold, the matted strands of solid material start to be drawn into the shearing blades. Now, liquefaction and homogenisation of the 17%-paunch-sludge can indeed take place.

The DAF-float, being fatty (greasy), can also be expected to provide a lubricating effect. Thus, the DAF-float being present, the friction associated with high blade forces is reduced. Lubrication makes it easier for the shearing blades to shear the solids, and reduces the abrasive forces on the blades, prolonging the service life of the blades, and reducing the time it takes to homogenize and emulsify the sludge.

As a result of the liquefaction of the paunch-sludge, the disposal of the paunch-sludge is much simplified, in that the liquefied sludge can be pumped into a storage tank and/or pumped and sprayed onto fields as fertilizer. Paunch-sludge (like any sludge) is generally easier to handle, and to dispose of, when in liquid form. Again, this easy-to-dispose-of paunch-sludge from the abattoir also contains the waste DAF-float material from the abattoir—the disposal of which, by itself, is also troublesome and expensive. The new homogeneous liquefied (emulsified) product, containing both the paunch-sludge and the DAF-float waste-products, might even have commercial value as a stable, odour-free, easily-applied, fertilizer.

The present technology contains an unexpected synergy. As mentioned, two of the waste-products of abattoirs and meat handling and packing plants generally, are paunch-sludge and DAF-float. As mentioned also, mixing and shearing these two together creates a product that can be readily and cheaply disposed of.

It is recognized that the proportions in which these two substances are present in the waste products from the meat plants are a good match to the proportions in which they need to be mixed in the shearing vessel. Thus, mixing the two substances together in the ratios in which they are naturally present facilitates the complete disposal of both of them.

As mentioned, the two substances are de-watered, prior to their being mixed in the shearing vessel. The de-watering should be as thorough as possible, in the commercially-practical sense, bearing in mind the equipment available. Leaving the substance to be treated not fully de-watered is wasteful, in that the sludge with its extra water of course all has to be handled and transported, the containment and treatment vessels have to be larger, and so on. However, it is usually not worth going beyond mechanical de-watering—for example, heating the sludge—in order to reduce its water content. As mentioned, typically, the paunch-sludge will be de-watered to e.g 17%-solids, and the DAF-float to 35%-solids.

However, in the new technology, the described shearing problem, with paunch-sludge, arises over a wide range of water contents. At the same time, the DAF-float is efficacious to reduce the shearing problems also over a wide range of water content. That is to say, it is the proportions of the dry-solids content of the two substances that is important from the standpoint of alleviating the shearing problems, rather than the overall volumes of the substances.

It is noted, again, that the liquefied product does, or can, contain (substantially) all of the waste paunch-sludge material, and all the DAF-float material, produced by the abattoir; that is to say, the relative proportions in which those two waste products appear, favours the creation of the synergistic effect as described. Also, such variations in the proportions as are likely to occur in an operational abattoir are unlikely to affect the synergistic effect.

Of course, there is, or can be, a variation, between abattoirs, in the extent as to which the fatty products are incorporated into the value-products produced by the abattoir. It is mainly the potentially-contaminated and dirty fats that are present in the abattoir wastewater. Thus, it is possible, e.g in an exceptional abattoir, that the quantity of DAF-float is too small to make the required difference to the shearability of the paunch sludge produced by that same abattoir. However, generally, the ratio of the mass-stream of DAF-float to the mass-stream of paunch-sludge is amply sufficient to procure the advantageous effects on shearing, as described.

Variations in the relative extents to which the two waste products are de-watered prior to mixing and shearing can be expected to have little impact on the synergistic effect. As a generality, the waste products should be de-watered as much as is economically practical. (The more de-watered the product, of course, the smaller the overall mass of product that has to be treated, in the shearing vessel.)

Too much de-watering is contra-indicated, however. There is a threshold of water/solids ratio beyond which shearing, no matter how energetic and violent, and even with the fatty DAF-float, will not be effective to liquefy the sludge, in that the sludge is just too dry. For this reason, the paunch-sludge should not be de-watered to more than 30%-solids, prior to shearing. The DAF-float should not be de-watered to more than 40%-solids.

It is not suggested that all the paunch-sludge and all the DAF-float from the abattoir have to go through just the one shearing vessel. Prudent system designers will see to it that the streams of waste products are handled and treated in an economical and efficient manner, and that suitable redundancy is provided to enable servicing, etc.

It is recognized that the new technology can be applied generally, when a sludge is difficult to liquefy because the sludge contains matted strands of solid material. That is to say, mixing the sludge (solids plus water) with a fatty substance, preferably itself a waste-product, prior to, or when, shearing the sludge, can be effective to enable a non-liquefiable sludge to be liquefied, or to enable an already liquefiable sludge to be economically liquefied to a lower viscosity.

Furthermore, given that sludges can only be liquefied (economically by shearing) below a certain threshold of solids-content, and given that the inclusion of the fatty substance enables that threshold to be raised, the technology enables a reduction in the overall mass of sludge material to be treated.

In general, then, the present technology can most advantageously be applied to sludge in which a substantial proportion of the organic solids of the sludge are matted bio-cellular strands. Examples include woody and fibrous substances derived from plants, cellulose filaments, stalks, blades of grass, hay, straw, hair, feathers, and the like. Of course, paunch-sludge is a particular example of an applicable biological sludge.

In the shearing-vessel, the thickener substance to be added is a substance that, when mixed and sheared with water, forms a viscous liquid, being a liquid having a viscosity that is substantially greater than that of water. The amount of the substance that should be added is an amount that raises enough of an increase in the viscosity of the resulting liquid medium that the tenacity with which the strands are held in the matted mass of strands is no longer sufficient to prevent the individual strands from being snagged by the movements of the liquid medium, and drawn into the shearing blades.

Preferably, in order for the thickener substance to be efficacious in this regard, the substance should contain lipid; preferably, at least 50% of the dry-mass of the substance should be lipid.

Given that mixing the water with the thickener takes much less energy than shearing of the solids, which is the main capability of the shearing blades, it can be expected that a homogeneous emulsion of the water and the thickener will form very rapidly. As the viscous emulsion starts to form, the increasing viscosity starts to draw the solid strands into the blades. Now, the biological cells of the solid strands are torn open, thereby releasing (some of) the captive-water.

The solid material of the cell is cut up into very small pieces, which are homogeneously dispersed through the liquid medium.

Preferably, the thickener includes a substantial fatty component. Fatty materials, in water, are present as waste from a number of industrial processes, whereby these materials are often available in large quantities at low or negative cost. Of course, DAF-float is a particular example of an applicable thickener substance.

The amount of energy needed to liquefy the sludge, with the thickener added, will depend on the particular sludge, the particular thickener, and the particular shearing equipment. Routine experimentation will quickly indicate the energy needed. Skilled designers of sludge shearing systems understand that heating the sludge in the shearing-vessel, changing its pH, and other measures, can increase the efficiency with which shearing creates a homogeneous liquid, and it should be expected that such measures will or might also be efficacious in the present case.

Heating the sludge, and adjusting its pH, can be effective to enhance the effects of shearing, not only as regards liquefying and homogenizing the sludge, but also as regards reducing numbers of pathogens present in the sludge. System designers may also consider, when shearing sludge, such additional shelf-life stability measures as pasteurization, pH adjustment, addition of antioxidants or preservatives, and the like.

The liquefied sludge can have utility as e.g an animal feed material or as e.g a substrate feed material for microbial production of bioenergy for example through methane or bio-ethanol production.

The following benefits of liquefaction of the sludge material can be listed.
(a) Thorough shearing can be advantageous as a means of killing pathogens in the sludge.
(b) The homogeneity and emulsification of the liquefied sludge can be effective to increase stability during storage of the sludge, in that new microbe colonies can take e.g months to become established and viable.
(c) Liquefaction can make the sludge suitable for use as animal feed, and can make the sludge suitable to be used as a bio-energy substrate source, in that liquefaction renders the material more readily digestible by the animal or bioenergy producing microbes, respectively.
(d) Liquefaction makes the sludge easy to pump, and enables the sludge to be sprayed onto or injected into soil.

DESCRIPTION OF THE DRAWING

The technology will now be further described with reference to the accompanying drawing, which is a diagram showing some of the processes that take place in an abattoir, and some of the waste products thereof.

The arrows 2 represent the passage of slaughtered animals through the abattoir. Paunch-sludge is collected at a paunch-sludge receiving-station 3.

In an abattoir, water is used in many of the processes and for cleaning. The resulting waste-water generally contains a good deal of fatty material, and is collected in the fatty-waste receiving station 4.

The water containing the fatty waste is passed through a Dissolved Air Flotation (DAF) station 5. Water under pressure, containing much dissolved air, is fed into the DAF station, its effect being to create bubbles of air in the wastewater. The rising bubbles pick up the fatty waste, whereby a frothy scum 6 forms at the surface, termed the DAF-float.

The paunch-sludge and the DAF-float are conveyed to de-watering stations 7. Thus far, the processes are conventional. But now, the de-watered paunch-sludge and the de-watered DAF-float are conveyed to a shearing vessel 8, having shearing blades 9 that are powered by a motor 10.

The shearing blades are switched on, whereby the paunch-sludge and the DAF-float are thoroughly mixed together—with the result, as described, that a (viscous) emulsion forms. The torn-apart pieces of solid bio-cellular material arising from the substances become thoroughly homogeneously dispersed through the emulsion. It can be regarded that the (tiny) solid particles are a component of the emulsion.

The liquefied sludge is then transferred, using pump 11, to storage-tank 12.

The de-watered sludge, and the DAF-float may be fed into the shearing vessel 8 on a continuous basis or a batch basis. When using the batch basis, a batch of sludge is placed in the vessel, together with a batch of DAF-float. Often, shearing of the batch is done slowly at first, and then faster, since the resistance forces from the sludge diminish as shearing progresses. Shearing is maintained until the sludge is fully liquefied. Then, the shearing stops, and the batch of now-liquefied sludge is transferred out of the vessel.

In actual tests, shearing was carried out on four samples of paunch-sludge and DAF-float. In each test, the paunch-sludge was de-watered to 17%-dry-solids (being stiff cake, non-pumpable sludge) and the DAF-float was de-watered to 35%-dry-solids (like hard butter).

In each test T1, T2, T3, T4, 0.8 kg of the 17%-paunch-sludge were mixed with a quantity Q kg of the DAF-float. The quantities Q1, Q2, Q3, Q4 were 0 kg, 0.15 kg, 0.3 kg, and 0.6 kg, respectively. (It should be noted that these masses are dry-masses: thus 0.8 kg of dry mass of 17% sludge represents 4.7 kg overall mass of sludge; 0.6 kg of dry-mass of 35% DAF-float represents 1.7 kg overall mass of DAF-float.

Expressed as the ratio R of the dry-mass of the DAF-float to the dry-mass of the sludge, the ratios R1, R2, R3, R4 were 0%, 19%, 38%, and 75%, respectively.

The outcome of these tests is shown below.

|  | T1 | T2 | T3 | T4 |
|---|---|---|---|---|
| dry-mass ratio, R % | R = 0% | =19% | =38% | =75% |
| initial resistance to shearing | very hi | high | low | negligible |
| tendency to create cavity | very hi | high | low | negligible |
| time to liquefy (minutes) | (no liq) | 15 | 8 | 3 |

In T1, it was not possible to liquefy the sludge down to a meaningful measure of viscosity.

In T2, it was necessary to resort to pulsing the speed of the shearing blades in order to counter the tendency to form a cavity, and to enable mixing/shearing to get under way.

In T3, pulsing was also resorted to, but to a lesser degree.

In T4, there was no tendency to form a cavity. Liquefaction got under way smoothly and immediately, without any need for pulsing. The liquefied product was highly homogeneous. The viscosity of the final product was 12,000 cP, which is like paint.

It is noted that the 75% ratio, R %, of DAF-float dry-mass to paunch-sludge dry-mass, in the shearing-vessel, is readily available in the stream of waste products emanating from an abattoir. Preferably, all the paunch-sludge and all DAF-float in the waste streams should be fed into the shearing vessel.

If more DAF-float happens to be available, the extra can be added into the shearing vessel substantially without detriment.

A ratio R of 30% or lower is not preferred; at that, liquefaction takes significantly longer and requires more energy, and the service life of the blades is likely to be shortened. A ratio R of 20% would be the practical minimum, below which the present technology has no more than a negligible effect.

It is generally true, in the field of shearing sludges, that effects created when shearing small samples can be scaled up to commercial treatment sizes. In this case, the improvement in shearing, when scaled up, can be expected to follow the ratio R.

It can also be expected that the beneficial effects attributable to the ratio R will be realised with the other sludges and the other fatty substances as described herein. In any event, the prudent systems designers will perform routine experiments to determine the best shearing parameters in the particular application, as they would in any new shearing application.

Some terms used herein:

M-D-BS is the mass of the body of sludge-solids in the shearing vessel, measured as dry-mass tonnes;

M-D-QT is the mass of the quantity of thickener solids in the shearing-vessel, measured as dry-mass tonnes;

M-D-Ab-PS is the mass of paunch-sludge solids produced by an abattoir in one day, measured as dry-mass tonnes per day.

M-D-Ab-DF is the mass of DAF-float solids produced by the same abattoir on the same day, measured as dry-mass tonnes per day.

The scope of the patent protection sought is defined by the accompanying claims. The apparatuses and procedures shown in the accompanying drawings and described herein are examples.

The invention claimed is:

1. Procedure for liquefying sludge, including:
providing a sludge-shearing vessel;
the vessel is equipped with operable shearing blades;
the blades are of such size and robustness as to be effective, when operated, to shear sludge residing in the vessel;
providing a vessel-body of sludge;
the vessel-body of sludge includes organic solids and water;
a substantial component of the vessel-body of sludge is in the form of bio-cellular strands;
providing a vessel-quantity of a biological thickener substance;
the chemical and physical characteristics of the thickener are such that, when the thickener is mixed with the water, a viscous liquid is formed, being a liquid having a viscosity that is substantially greater than that of the water;
placing the vessel-body of sludge and the vessel-quantity of thickener together in the vessel;
forming a viscous vessel-mixture by mixing the water of the vessel-body of sludge with the vessel-quantity of thickener, the solids being dispersed in the viscous vessel-mixture;
so operating the shearing blades as to subject the vessel-mixture to violent shearing;
operating the shearing blades with enough energy to liquefy the sludge; and
transferring the liquefied sludge out of the vessel.

2. Procedure for liquefying sludge as claimed in claim 1, including providing the vessel-body of the sludge and the vessel-quantity of the thickener in such proportions, relative to each other, that the vessel-mixture is capable of being liquefied to a viscosity of 12,000 centiPoise, or less, in which the solid pieces are dispersed substantially homogeneously.

3. Procedure for liquefying sludge as claimed in claim 1, wherein the bio-cellular strands in the vessel-body of sludge are stalks or stems of plant material.

4. Procedure for liquefying sludge as claimed in claim 1, wherein, in the body of sludge that is, or is to be, placed in the vessel, prior to the thickener being mixed with the sludge, at least 50% of the dry-mass content of the sludge is in the form of strands that are at least 25 mm long and no more than 5 sq·mm in cross-sectional area.

5. Procedure for liquefying sludge as claimed in claim 1, wherein the bio-cellular strands in the sludge include woody and fibrous substances derived from plants, cellulose filaments, stalks, blades of grass, hay, straw, hair, or feathers.

6. Procedure for liquefying sludge as claimed in claim 1, wherein the vessel-body of sludge has been de-watered to a dry-solids content of ten percent, or more, prior to being placed in the shearing vessel.

7. Procedure for liquefying sludge as claimed in claim 1, wherein a major component of the vessel-body of sludge is paunch-sludge, derived from an abattoir.

8. Procedure for liquefying sludge as claimed in claim 1, wherein at least 50% of the dry-mass of the thickener substance is lipid.

9. Procedure for liquefying sludge as claimed in claim 1, wherein a major component of the thickener substance is animal fat.

10. Procedure for liquefying sludge as claimed in 1, wherein a major component of the thickener substance is DAF-float, derived from an abattoir.

11. Procedure for liquefying sludge as claimed in claim 1, wherein:
the vessel-body of sludge has a dry-mass M-D-BS of sludge-solids;
the vessel-quantity of thickener has a dry-mass M-D-QT of thickener-solids;
the ratio M-D-QT/M-D-BS is greater than 20% or is greater than 30%.

12. Procedure for liquefying sludge as claimed in claim 1, including:
pumping the liquefied sludge into a storage tank;
after the liquefied sludge has remained in the storage tank for a storage period, during which the sludge has remained stable as to its biological characteristics, pumping the liquefied sludge out of the tank, and onto an agricultural field, as a fertilizer.

13. Procedure for liquefying sludge as claimed in claim 1, including, with respect to the body of sludge in the shearing vessel, heating the sludge and adjusting the pH of the sludge in such operational combination that pathogens are substantially eliminated from the liquefied sludge transferred out of the vessel.

14. Procedure for liquefying sludge as claimed in claim 1, including, with respect to the body of sludge in the shearing vessel, pasteurizing the sludge and adding an antioxidant or preservative in such operational combination as to extend the shelf life of the liquefied sludge transferred out of the vessel.

15. Procedure for liquefying sludge as claimed in claim 1, wherein, the thickener having been mixed with water:

the vessel-quantity of the thickener substance contains enough greasy lubricant to lower the tenacity with which the strands are held in the matted mass of strands;

thereby enabling individual strands to be snagged by the movements of the liquid medium, and to be drawn into the shearing blades.

16. Procedure for liquefying sludge as claimed in claim 1, wherein the strands are so configured, and are so matted in the sludge, that:

the viscosity of the vessel-mixture were below a threshold of viscosity, operating the shearing blades would then have no significant mixing effect on those of the matted strands that are located beyond the shearing blades;

if the vessel-quantity of thickener were absent from the vessel, the viscosity of the vessel-mixture then would be below that threshold;

the viscosity of the liquid being above that threshold, operating the shearing blades now is effective to mix and liquefy the vessel-body of sludge, as a whole body;

the vessel-quantity of thickener being present in the vessel, the viscosity of the vessel-mixture now is above the threshold.

17. Procedure for liquefying sludge as claimed in claim 16, including providing the vessel-body of the sludge and the vessel-quantity of the thickener in such proportions, relative to each other, that the vessel-mixture is capable of being liquefied to a viscosity of 12,000 centiPoise, or less in which the solids pieces are dispersed substantially homogeneously.

18. Procedure for liquefying sludge as claimed in claim 16, wherein the bio-cellular strands in the vessel-body of sludge are stalks or stems of plant material.

19. Procedure for liquefying sludge as claimed in claim 17, wherein, in the body of sludge that is, or is to be, placed in the vessel, prior to the thickener being mixed with the sludge, at least 50% of the dry-mass content of the sludge is in the form of bio-cellular strands.

20. Procedure for liquefying sludge as claimed in claim 17, wherein the bio-cellular strands in the sludge include woody and fibrous substances derived from plants, cellulose filaments, stalks, blades of grass, hay, straw, hair, or feathers.

21. Procedure for liquefying sludge as claimed in claim 17, wherein the vessel-body of sludge has been de-watered to a dry-solids content of ten percent, or more, prior to being placed in the shearing vessel.

22. A procedure for operating an abattoir, wherein:

the abattoir is so operated as to yield paunch-sludge as a waste-product, at the average rate of only M-D-Ab-Ps dry-mass tonnes per day;

the abattoir is so operated as to yield DAF-float as a waste-product, a the average rate of only D-D-Ab-DF dry-mass tonnes per day;

The procedure includes conveying the paunch-sludge and the DAF-float, at those rates, into a shearing vessel;

the vessel is equipped with power-operated shearing blades;

the blades are of such size and robustness as to be effective, wherein operated, to shear sludge residing in the vessel;

the procedure includes so mixing the paunch-sludge and the DAF-float, in the shearing vessel, that the vessel-mixture of viscous liquid is formed, and the solid material is dispersed in the viscous liquid;

operating the shearing blades in such manner as to subject the vessel-mixture to violent shearing;

operating the shearing blades with enough energy to liquefy the paunch-sludge; and transferring the liquefied paunch-sludge out of the vessel.

23. Procedure for liquefying sludge as claimed in claim 22, wherein the ratio M-D-Ab-PS/M-D-Ab-DF is greater than 20% or is greater than 30%.

* * * * *